United States Patent Office 2,719,082
Patented Sept. 27, 1955

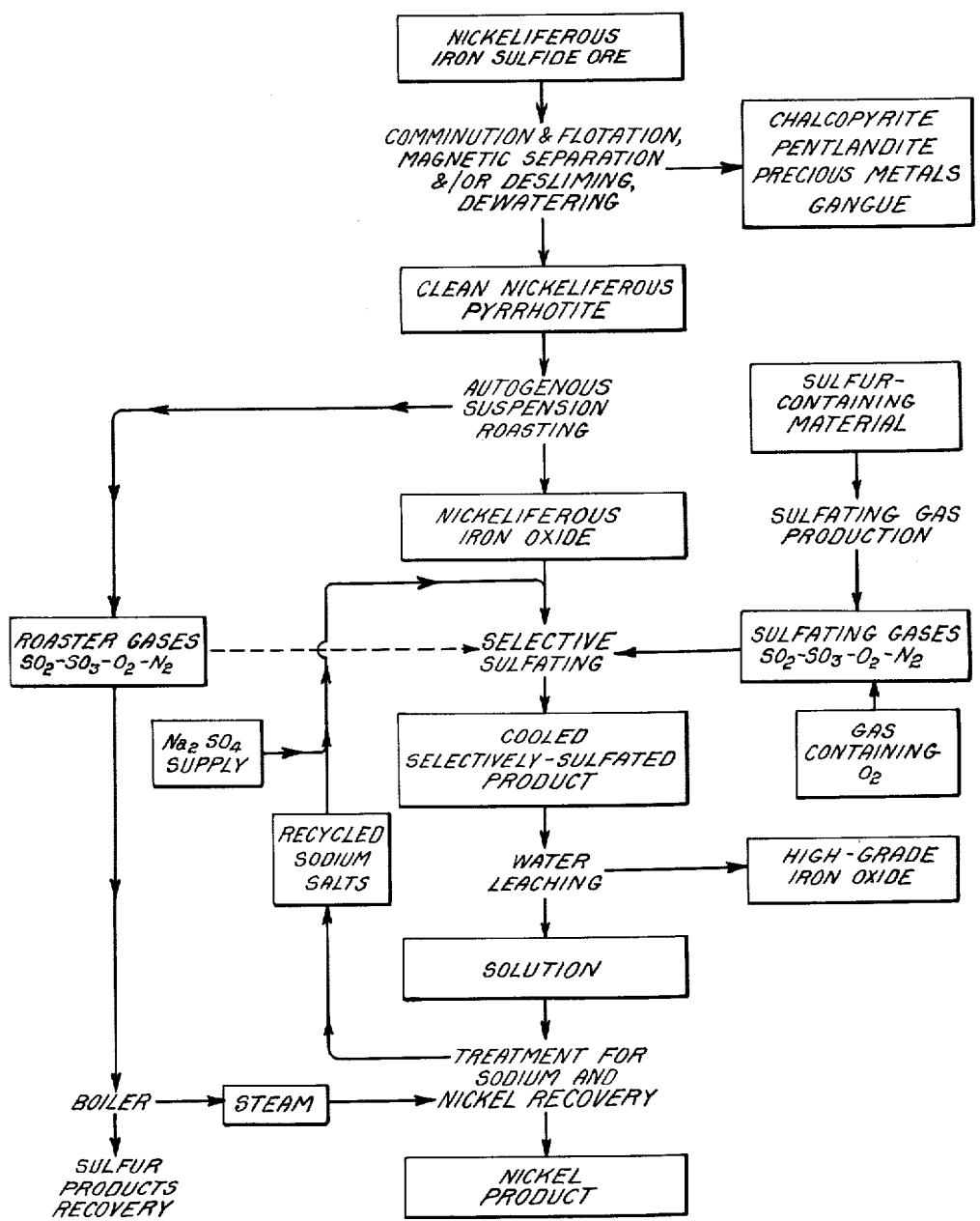

2,719,082

METHOD FOR PRODUCING HIGH GRADE HEMATITE FROM NICKELIFEROUS IRON SULFIDE ORE

William Kelvin Sproule, Copper Cliff, Ontario, Canada, Paul Etienne Queneau, Fairfield, Conn., and George Clyde Nowlan, Jr., Coniston, Ontario, Canada, assignors to The International Nickel Company, Inc., New York, N. Y., a corporation of Delaware Application May 15, 1952, Serial No. 287,836

Claims priority, application Canada June 11, 1951

11 Claims. (Cl. 75—3)

The present invention relates to an improved method for producing high-grade hematite from iron-containing sulfide ore and more particularly to an improved process for treating sulfide ore containing nickel, copper and iron to recover therefrom substantially pure iron oxide eminently suitable for iron and steel production.

Heretofore, the art has endeavored to recover uncontaminated iron oxide from sulfide ores containing substantial amounts of nickel, copper and cobalt by various methods including various leaching or chemical extraction operations based on selective sulfation. However, from the viewpoint of economically producing iron oxide of sufficiently high quality to satisfy the strict metallurgical requirements of the iron and steel industry, such processes proposed heretofore have failed because they could not meet the aforesaid requirements and usually also because of unduly high process costs. Thus, to be generally acceptable, premium grade lump iron oxide for the manufacture of iron and steel should contain on the dry basis more than about 65% iron, less than about 0.15% nickel, less than about 0.03% sulfur, and less than about 5% gangue. Such elements as nickel, copper, cobalt, zinc, and sulfur are considered undesirable contaminants in premium-grade iron oxide even in very small amounts. Silica should also be low. Satisfactory nickel elimination from nickeliferous iron sulfide ores, with concomitant production of high-grade iron oxide has been found so difficult that, as far as we are aware, a process to achieve this purpose has never been carried into practice commercially on an industrial scale.

An improved process has now been discovered for successfully and economically producing high-quality, premium-grade hematite from sulfide ore containing iron, nickel, copper, cobalt and siliceous gangue.

It is an object of the present invention to provide an improved process for treating sulfide ores rich in iron and containing nickel, copper and cobalt-bearing minerals to obtain a premium-grade iron oxide suitable for manufacture into iron and steel.

Another object of the invention is to provide an improved process for treating sulfide ore containing iron, nickel, copper and cobalt so as to produce hematite comparable in quality to the best known grades of iron ore and satisfactorily free from contaminating elements, particularly nickel.

It is a further object of the invention to provide a process comprising a novel combination of operations for successfully and economically producing from iron-rich, nickel-containing sulfide ores a high-grade iron ore. This iron ore is suitable for agglomeration into premium grade lumps for production of pig iron and high-quality open-hearth and electric furnace steels, and can also be used for the production of sponge iron.

Other objects and advantages will become apparent from the following description taken in conjunction with the accompanying drawing which illustrates a flow-sheet of a preferred embodiment of the invention.

Generally speaking, the present invention contemplates first subjecting sulfide ores containing nickeliferous iron sulfide, e. g., pyrrhotite, to a series of comminution and concentration operations, e. g., froth flotation operations, preferably in conjunction with magnetic separation and/or desliming operations, followed by dewatering operations to effect a very clean separation between the aforesaid pyrrhotite and the other constituents of the ore. The finely-divided iron sulfide concentrate produced by the foregoing operations and containing relatively small amounts of non-ferrous metal sulfide contaminants and also small amounts of silica, lime, alumina and magnesia is suspension roasted under critically-controlled oxidizing conditions to form an active, permeable calcine which is then selectively sulfated in the presence of a small critical amount of sodium sulfate under critically controlled conditions of time, temperature and atmosphere. The selectively-sulfated product is then water leached to remove substantially all of the contaminating non-ferrous metal elements, particularly nickel, as water-soluble compounds while dissolving substantially none of the iron, leaving a water-insoluble, substantially uncontaminated iron oxide product.

More specifically the improved process provided by the present invention comprises a series of essential critical operations in novel combination for treating ores containing iron sulfide, e. g., pyrrhotite, as a main constituent. In particular, the present process is directed to the treatment of Sudbury-type ores containing up to about 50% nickeliferous pyrrhotite, the other constituents being such minerals as cobalt-containing pentlandite and chalcopyrite in an amount up to about 20%, the balance being substantially gangue consisting mainly of silica together with smaller amounts of alumina, lime and magnesia, to produce a premium-grade hematite sufficiently low in deleterious materials to be eminently suitable for the production of iron and steel. For example, the ore is comminuted to a particle size of not more than about 20% plus 65 mesh and is then subjected to multistage froth flotation with or without magnetic separation, to separate the bulk of the contaminating nickel, cobalt, copper and gangue minerals from the nickeliferous pyrrhotite. For the purpose of the present process the pyrrhotite fraction or concentrate at this point still contains a small, yet undesirably high, amount of unliberated contaminating minerals and gangue. The pyrrhotite is therefore comminuted to a very fine particle size of not more than about 5% plus 200 mesh, subjected to further froth flotation and also magnetic separation with or without desliming operations to produce a final clean nickeliferous pyrrhotite concentrate containing not more than about 1% nickel which is present in the pyrrhotite concentrate primarily as a dissolved or submicroscopically dispersed contaminant, not more than about 0.1% copper, less than about 2.5% silica, and less than about 2.5% total alumina, lime and magnesia.

After dewatering, the nickeliferous pyrrhotite concentrate is suspension roasted, i. e., either by flash roasting or fluid bed roasting methods, in an oxidizing atmosphere at a temperature not less than about 1200° F. and below 1400° F. to produce an active, permeable, iron oxide calcine containing little sulfide sulfur, preferably less than 1% sulfide sulfur. The concentrate particle temperature in the roaster must be controlled, for instance by artificially cooling the bed or by recirculation of roaster exhaust gas to limit the oxygen content of the roaster atmosphere, and the roasting temperature preferably should not be more than about 1300° F.

The calcine produced by the preceding roasting operation is admixed, preferably while still at approximately the roasting temperature, with more than about 2% and less than about 8%, preferably with about 3% to about 6%, by weight of sodium sulfate and then treated at a temperature not less than about 1200° F. and not more than about 1300° F. in an atmosphere containing more than 4% sulfur dioxide, preferably more than 6% sulfur dioxide, and more than about 5% free oxygen, the balance being mainly nitrogen. The sodium sulfate should not be coarser than about 65 mesh. Subjection of the permeable calcine to the foregoing critical conditions of temperature and atmosphere composition for not less than about one hour, when admixed with sodium sulfate in an amount within the foregoing critical range, yields a selectively-sulfated product wherein more than about 85% of the nickel and substantially all of the contaminating cobalt and copper but not more than about 2% of the iron is rendered water soluble.

Heretofore, the criticality of selective-sulfating operations when applied specifically to the treatment of nickeliferous materials has not been realized. Controlled selective sulfation of nickeliferous sulfides is much more difficult than is controlled selective sulfation of sulfides containing copper, zinc, or even cobalt. For instance, in the case of the sulfating of copper-bearing sulfides it is well known that such procedures can be carried out in a single, combination roasting and sulfating vessel. In selectively sulfating nickeliferous sulfides, extreme care must be taken to control the critical operational factors of temperature, time and atmosphere composition if the required selectivity of sulfation is to be obtained. Although good results insofar as nickel extractability can be obtained by employing a two-stage roasting and sulfating procedure in which the sulfating gases are obtained from the roaster, it is preferred to employ a three-unit treatment in which the sulfating atmosphere is separately and independently produced in a special gas producer, e. g., in a fluid-bed roaster treating iron sulfide, and then introduced directly to the sulfating kiln. By this three-unit procedure, two advantages accrue. First, the roaster is relieved of the burden of simultaneously producing both a permeable calcine highly amenable to selective-sulfation and, in addition, a sulfating gas which is optimum for the sulfating operations. Second, the composition of the sulfating gas being a most important factor, the optimum composition can best be obtained by manufacture of this gas in a separate and independently-controlled gas producer devoted primarily to this purpose wherein all conditions can be maintained ideal for the manufacture of gas of the desired composition. In other words, in this independent and separately controlled gas producer, primary consideration can be given to obtaining optimum conditions for the generation of sulfur dioxide and sulfur trioxide with respect to reaction times, temperatures, the use of catalysts for the conversion of sulfur dioxide to sulfur trioxide and the control of the oxygen concentration. Conversely, the suspension-roasting operation is controlled primarily from the viewpoint of obtaining the optimum quality of highly-active, permeable calcine. In the sulfating kiln, the operating temperatures and the partial pressures of the gaseous components are controlled independently of the roasting operation, thereby more strongly favoring rapid and substantially complete sulfation of the nickel while concomitantly avoiding the formation of water-soluble iron salts. For instance, employing this embodiment of the present invention, gas containing about 8% to about 12% sulfur dioxide, more than about 5% free oxygen, and the balance mainly nitrogen suitable for use as a sulfating atmosphere, can be manufactured separately and independently of all the other operations by fluid-bed roasting pyrrhotite concentrate. Roaster temperature control can be obtained by recirculating a portion of the calcine in the roaster operation or by recirculation of a portion of the roaster gas after the gas has been cooled by passage through a boiler, by employing cooling coils in the roaster bed and/or by employing water sprays. Care must be taken to maintain sufficient oxygen content, preferably in an amount equivalent to at least one-half the sulfur dioxide content, in the furnace sulfating atmosphere. Sulfur dioxide can also be recovered from the roaster gas if desired and then introduced into the sulfating furnace atmosphere with provision for maintenance of proper oxygen concentration. As a result, maximum water solubility of nickel and minimum water solubility of iron are obtained by employing the aforesaid preferred three-unit roasting gas-producing-sulfating embodiment of the present invention.

We have discovered the surprising fact that the proportion of nickel commercially extractable from nickeliferous pyrrhotite concentrate is sharply increased by decreasing the nickel content of the pyrrhotite concentrate prior to the roasting, sulfating and leaching operations. The reverse is normally expected. For instance, the percentage extractability of any given element in an ore by any given process tends to increase with increase in the proportion of that element present in the ore. The unexpected reversal of the general rule in this case is indicated in the following Table I. We have discovered that the sulfating process works much more satisfactorily, i. e., permits a higher percentage of contaminating nickel extraction, requires less treatment and addition reagents and yields a more valuable iron oxide, when applied to the treatment of clean nickeliferous pyrrhotite than when applied to relatively unclean nickeliferous pyrrhotite. The great benefit thus accruing has not been previously known since the required stringent cleaning of pyrrhotite concentrate prior to sulfating has not been recognized by prior investigators.

TABLE I

| Percent Ni in Pyrrhotite Concentrate | Sulfating time required for maximum Nickel Extraction, hr. | Residual Ni in leached Iron Oxide, Percent | Ni Extraction, Percent |
| --- | --- | --- | --- |
| 0.80 | 1 | 0.13 | 86 |
| 1.16 | 2 | 0.22 | 83 |
| 1.46 | 3 | 0.42 | 74 |

The concentrate was in each case roasted in air at 1250° F., mixed with 3% sodium sulfate, and then sulfated at 1250° F. in a rotating kiln in an atmosphere containing 4.5% sulfur dioxide. Although increases in the $SO_2$ content of the gas, in the amount of sodium sulfate employed, and in sulfating time, within commercially practicable limits beyond those given in Table I, increased nickel extractability, iron oxide of satisfactorily low nickel content was not obtained from the high nickel pyrrhotite concentrates. Presence of silicate gangue or basic minerals also has a detrimental effect on the sulfating process.

In order to illustrate the benefits obtained by employing additions of sodium sulfate in the amounts contemplated by the present invention, experiments were performed in which varying amounts of sodium sulfate were admixed with iron oxide calcine. This calcine was produced from a pyrrhotite concentrate prepared in accordance with the present invention, containing about 0.85% nickel and had a particle size of about 4% plus 200 mesh. The calcine was then treated under the sulfating conditions of temperature, time and atmosphere within the scope of the present invention. The data showing the markedly improved water-solubility of nickel when employing sodium sulfate in the contemplated amounts are given in following Table II.

TABLE II

| Percent Na₂SO₄ addition | Percent Nickel water soluble |
|---|---|
| 0 | 28 |
| 1.0 | 62 |
| 2.0 | 80 |
| 2.5 | 86 |
| 4.0 | 86 |
| 5.0 | 88 |
| 8.0 | 89 |

From the foregoing data, it is seen that with this calcine more than 2% sodium sulfate is required to obtain more than the 85% water solubility of nickel necessary to yield the required final high-grade iron oxide product of the present process and that increase in sodium sulfate additions over about 2.5% no longer gave substantial increase in the nickel solubility. Sodium sulfate additions of more than about 8% are not warranted commercially in the present process and in any case tend to cause operating difficulties such as accretion build-up in the kiln.

Another benefit to be derived by employing sodium sulfate as the particular addition agent in the sulfating operation is the fact that substantially all the sodium sulfate can be subsequently recovered from the final leach solution. Thus, we prefer to operate the process in a cyclic manner with respect to sodium sulfate, e. g., by returning the sodium sulfate content of the barren aqueous leaching solution, from which nickel, cobalt and copper have been previously removed, to the roasting or sulfating furnace, e. g., by salting out of the sodium sulfate in a separate evaporator and addition of this salt to the sulfating furnace or by the evaporation of the solution through its direct injection into the suspension roaster. It is essential to employ sodium sulfate as an addition reagent in the present process rather than the sodium chloride sometimes employed in solubilizing non-ferrous values in the residues from roasting of iron sulfide, in order to employ the reagent cyclically as described above since sodium chloride is largely decomposed in the sulfating furnace and the chlorine lost. Another disadvantage attending the use of sodium chloride is the production of chlorine and chlorine compounds which have a highly corrosive action on process equipment as well as resulting in the venting of noxious gases to the atmosphere.

As stated hereinbefore, the sulfating temperature must be within the critical range of about 1200° F. to about 1300° F. Following Table III presents data showing the effect of sulfating at temperatures within and outside the aforesaid critical temperature range.

TABLE III

| Sulfating Temp., °F. | Time, Hrs. | Max. Ni Solubility, Percent | Max. Fe Solubility, Percent |
|---|---|---|---|
| 1,150 | 3 | 47 | 4.0 |
| 1,200 | 2½ | 82 | 1.0 |
| 1,250 | 2 | 86 | 0.3 |
| 1,300 | 2 | 87 | 0.3 |
| 1,350 | 3 | 48 | 0.1 |

The foregoing data show that at temperatures outside the critical range of the present process, e. g., 1150° F. and 1350° F., the maximum possible amounts of water-soluble nickel that can be obtained are far below the percent soluble nickel necessary to meet the final product requirements satisfied by the present process.

After the calcine has been selectively sulfated, it is then subjected to a conventional countercurrent water leaching operation to dissolve the contaminating non-ferrous metals as water-soluble sulfates from the insoluble iron oxide, dewatering being accomplished by known methods of solid-liquid separation, such as by thickening and filtration. The iron oxide is then agglomerated by methods known in the art of iron ore preparation, such as by pelletizing, sintering, nodulizing, briquetting, etc., to form premium, lump iron oxide containing more than about 65% iron, less than about 0.15% nickel, not more than about 0.01% cobalt, not more than about 0.01% copper, less than about 2½% silica and less than about 2½% total alumina, lime and magnesia.

The sulfur content of the iron oxide can readily be reduced to not more than about 0.1% sulfide sulfur by the roasting and sulfating operations of the present process and to below 0.03% sulfur during subsequent agglomeration.

The roasting, sulfating and leaching operations of the present process are also effective in eliminating zinc contamination in an iron sulfide ore.

For the purpose of giving those skilled in the art a better appreciation of the advantages of the invention, the following illustrative example is given:

An ore rich in nickeliferous pyrrhotite of the Sudbury type, containing about 3% pentlandite, about 20% pyrrhotite, about 3% chalcopyrite and the balance mainly gangue was comminuted to a fineness of about 15% plus 65 mesh. The comminuted ore was subjected to a two-stage froth flotation operation using a potassium amyl xanthate collector in a lime circuit, a pine oil frother, and sodium silicate as a dispersing reagent, to recover therefrom a concentrate containing the bulk of the chalcopyrite, and pentlandite and a concentrate containing the bulk of the pyrrhotite while rejecting a gangue tailing. The pyrrhotite product from the aforementioned flotation treatment was then deslimed. The coarse fraction containing the bulk of the pyrrhotite and containing about 1.25% nickel and about 0.25% copper, was then further comminuted at a rate of 30 tons per day to a fineness of about 5% plus 200 mesh. Finally, this ground pyrrhotite concentrate was given final flotation using a potassium amyl xanthate collector in a lime circuit at about pH 11 to float substantially all of the remaining chalcopyrite and pentlandite and then, using copper sulfate and a neutral circuit, the final pyrrhotite concentrate was floated from remaining gangue. The foregoing pyrrhotite concentrate was then dewatered and dried to a moisture content of about 0.25%.

Twenty-five tons per day of the dried pyrrhotite concentrate, containing about 2% silica, about 0.85% nickel and about 0.07% copper were then autogenously suspension-roasted by injection with air into a suspension-roasting furnace. The ratio of said air-pyrrhotite mixture was controlled to yield a flame temperature of about 1200° F., the heat from the exothermic oxidation reaction being balanced by heat in the outgoing products and by heat dissipated through the furnace walls. Hot sulfur dioxide-bearing gases, suitable for promoting selective sulfation of nickel contained in the hot calcine, were separately manufactured in an independently controlled gas producer as described hereinbefore and were introduced concurrently with the hot calcine and 4% fine Na₂SO₄ into a rotary kiln, 3 feet diameter by 40 feet long. The foregoing sulfating gases contained about 8% sulfur dioxide and 8% oxygen, the balance being mainly nitrogen. For the treatment of twenty tons per day of pyrrhotite concentrate, about 700 cubic feet per minute (at 1220° F.) of the sulfating gases from the gas producer were required. The calcine was treated at a temperature of 1220° F. for about 2 to 3 hours during which time more than 85% of the nickel was rendered water soluble. The selectively-sulfated calcine was cooled to about 400° F. and then quenched in water and leached countercurrently to yield an iron oxide having the composition given in following Table IV, and a solution containing up to about 20 grams per liter of nickel, 20 to 40 grams per liter iron and 80 grams per liter of sodium sulfate. This solution may be treated by any desired method, including methods disclosed in the prior art, to recover nickel and sodium sulfate.

TABLE V

*Analysis of iron oxide product*

| Constituent: | Per cent |
|---|---|
| Iron | 66 |
| Nickel | 0.11 |
| Cobalt | 0.005 |
| Copper | 0.005 |
| Sulfur | 0.10 |
| Manganese | 0.01 |
| Phosphorus | 0.01 |
| Silica | 2.0 |
| Alumina, magnesia, lime, total | 2.0 |

The present invention is particularly applicable to the treatment of iron sulfide ores containing nickeliferous pyrrhotite, to produce therefrom an iron oxide product sufficiently free from nickel to be suitable as a premium-grade iron oxide for the manufacture of iron and steel. None of the previously proposed prior art selective sulfating processes for achieving this object have been successful.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. A process for producing high-grade hematite or iron oxide from sulfide ore containing nickeliferous pyrrhotite in an amount up to about 50%, nickel, cobalt, and copper sulfides in amounts up to a total of about 20%, with nickel constituting at least about 1% of the total sulfide content of the ore, the balance of the ore being mainly siliceous gangue, which comprises comminuting the ore to a particle size of not more than about 20% plus 65 mesh; subjecting the comminuted ore to froth flotation to separate therefrom the bulk of the nickel, cobalt and copper sulfides and gangue to obtain a nickeliferous pyrrhotite concentrate; comminuting said concentrate to a particle size of not more than about 5% plus 200 mesh; subjecting said comminuted concentrate to froth flotation, magnetic separation, desliming and dewatering operations to produce a finely-divided, clean, nickeliferous pyrrhotite concentrate containing not more than about 0.85% nickel, not more than about 0.1% copper, less than about 2.5% silica and less than about 2.5% total alumina, lime and magnesia; suspension roasting said pyrrhotite concentrate in an oxidizing atmosphere at a temperature not less than about 1200° F. and below about 1400° F. to produce an active, permeable calcine containing less than 1% sulfide sulfur; mixing said calcine while still at approximately the roasting temperature with about 3% to about 6% by weight of sodium sulfate of a particle size not coarser than about 65 mesh; subjecting the mixture of calcine and sodium sulfate to a sulfating atmosphere containing more than about 6% sulfur dioxide, free oxygen in an amount equivalent to at least one half the sulfur dioxide content and more than about 5% and the balance mainly nitrogen at a temperature between 1200° F. and 1300° F. for a time of not less than about one hour and sufficient to obtain a selectively sulfated calcine containing not more than about 0.1% sulfide sulfur and having substantially all of its contaminating nickel-metal content in a water soluble form suitable for substantially maximum nickel extraction by water leaching; leaching said selectively-sulfated calcine in water to dissolve therefrom more than about 85% of its contaminating nickel content, substantially all of its contaminating cobalt and copper content and not more than about 2% of its iron content and to obtain as a water-insoluble product a high-grade hematite containing more than about 65% iron, less than about 0.15% nickel, less than about 0.1% copper, less than about 0.01% cobalt, less than about 2.5% silica and less than about 2.5% total alumina, lime and magnesia; and agglomerating said water-insoluble product to premium-grade, lump iron oxide containing less than about 0.03% sulfur and eminently suitable for the manufacture of iron and steel.

2. A process as set forth in claim 1 in which the sulfating atmosphere containing more than about 6% sulfur dioxide, more than about 5% oxygen and the balance mainly nitrogen is produced separately and independently of the suspension roasting operation, the mixture of calcine and sodium sulfate being exposed to said sulfating atmosphere.

3. A process as set forth in claim 1 in which the sulfating atmosphere is produced separately and independently of the suspension roasting operation by means of fluid-bed roasting of iron sulfide to obtain a sulfating atmosphere containing about 8% to about 12% sulfur dioxide, more than about 5% free oxygen and the balance mainly nitrogen, the mixture of calcine and sodium sulfate being exposed to said atmosphere.

4. A process as set forth in claim 1 in which a portion of the roaster exhaust gas is returned to the roaster.

5. A process as set forth in claim 1 in which a portion of the active permeable calcine is returned to the roaster.

6. A process for producing high-grade hematite or iron oxide from sulfide mineral material containing nickeliferous pyrrhotite together with a small amount of at least one other metal-sulfide mineral containing at least one metal from the group consisting of nickel, cobalt and copper, with nickel constituting at least about 1% of the total sulfide content of the mineral material, the balance of the mineral material being mainly siliceous gangue, which comprises subjecting said sulfide mineral material to a series of comminution and concentration operations to obtain a finely-divided, clean, nickeliferous pyrrhotite concentrate containing not more than about 0.85% nickel, not more than about 0.1% copper, less than about 2.5% silica and less than about 2.5% total alumina, lime and magnesia; suspension roasting said pyrrhotite concentrate in an oxidizing atmosphere at a temperature not less than about 1200° F. and below about 1400° F. to produce an active, permeable calcine containing less than 1% sulfide sulfur; mixing said calcine with about 3% to about 6% by weight of sodium sulfate; subjecting the mixture of calcine and sodium sulfate to a sulfating atmosphere containing more than about 4% sulfur dioxide, free oxygen in an amount equivalent to at least one half the sulfur dioxide content and more than about 5% and the balance mainly nitrogen at a temperature between 1200° F. and 1300° F. for a time of not less than about one hour and sufficient to obtain a selectively sulfated calcine containing not more than about 0.1% sulfide sulfur and having substantially all of its contaminating nickel-metal content in a water-soluble form suitable for substantially maximum nickel extraction by water leaching; leaching said selectively-sulfated calcine in water to dissolve therefrom more than about 85% of its contaminating nickel content, substantially all of its contaminating cobalt and copper content and not more than about 2% of its iron content, and to obtain as a water-insoluble product a high-grade hematite containing more than about 65% iron, less than about 0.15% nickel, less than about 0.01% copper, less than about 0.01% cobalt, less than about 2.5% silica and less than about 2.5% total alumina, lime and magnesia; said water-insoluble product capable of being agglomerated to premium-grade, lump iron oxide eminently suitable for the manufacture of iron and steel.

7. A process for producing high-grade hematite or iron oxide from sulfide mineral material containing nickeliferous pyrrhotite and a small amount of at least one other metal-sulfide mineral, with nickel constituting at least about 1% of the total sulfide content of the mineral material, the balance of the mineral material being mainly siliceous gangue, which comprises subjecting said sulfide ore to a series of comminution and concentration operations to obtain a finely-divided, clean, nickeliferous pyrrhotite concentrate containing not more than about 0.85% nickel, not more than about 0.1% copper, less than about 2.5% silica and less than about 2.5% total alumina, lime and magnesia; suspension roasting said pyrrhotite concentrate in an oxidizing atmosphere at a temperature not less than about 1200° F. and below about 1400° F. to produce an active, permeable, low-sulfur calcine; mixing said calcine with more than about 2% and less than about 8% by weight of sodium sulfate; subjecting the mixture of calcine and sodium sulfate to a sulfating atmosphere containing more than about 4% sulfur dioxide, more than about 5% free oxygen and the balance mainly nitrogen at a temperature between 1200° F. and 1300° F. for a time of not less than about one hour and sufficient to obtain a selectively sulfated calcine low in sulfide sulfur and having substantially all of its contaminating nickel-metal content in a water soluble form suitable for substantially maximum nickel extraction by water leaching; leaching said selectively-sulfated calcine in water to dissolve therefrom more than about 85% of its contaminating nickel content, substantially all of its contaminating cobalt and copper content and not more than about 2% of its iron content, and to obtain as a water-insoluble product a high-grade hematite containing more than about 65% iron, less than about 0.15% nickel, and less than about 5% gangue; said water-insoluble product being eminently suitable for the manufacture of iron and steel.

8. A process as set forth in claim 1 in which the sulfating atmosphere containing more than about 4% sulfur dioxide, more than about 5% oxygen and the balance mainly nitrogen is produced separately and independently of the suspension roasting operation, the mixture of calcine and sodium sulfate being exposed to said sulfating atmosphere.

9. A process as set forth in claim 1 in which the sulfating atmosphere is produced separately and independently of the suspension roasting operation by means of fluid-bed roasting of iron sulfide to obtain a sulfating atmosphere containing about 8% to about 12% sulfur dioxide, more than about 5% free oxygen and the balance mainly nitrogen, the mixture of calcine and sodium sulfate being exposed to said atmosphere.

10. A process as set forth in claim 1 in which a portion of the roaster exhaust gas is returned to the roaster.

11. A process as set forth in claim 1 in which a portion of the active permeable calcine is returned to the roaster.

References Cited in the file of this patent
UNITED STATES PATENTS

| | | |
|---|---|---|
| 1,041,060 | French | Oct. 15, 1912 |
| 1,182,320 | Ryan | May 9, 1916 |
| 1,315,761 | Coolbaugh | Sept. 9, 1919 |
| 1,575,852 | McCormack | Mar. 9, 1926 |
| 1,590,525 | Kichline | June 29, 1926 |
| 1,749,125 | Brinker | Mar. 4, 1930 |
| 2,009,733 | Hechenbleikner | July 30, 1935 |
| 2,036,015 | Broderick et al. | Mar. 3, 1936 |
| 2,039,645 | Hechenbleikner | May 5, 1936 |
| 2,345,067 | Osann | Mar. 28, 1944 |
| 2,522,576 | Ingraham | Sept. 19, 1950 |
| 2,556,215 | Queneau et al. | June 12, 1951 |

UNITED STATES PATENT OFFICE

CERTIFICATE OF CORRECTION

Patent No. 2,719,082

September 27, 1955

William Kelvin Sproule et al.

It is hereby certified that error appears in the printed specification of the above numbered patent requiring correction and that the said Letters Patent should read as corrected below.

Column 6, lines 49 and 50, for "uspension-roasted" read -- suspension-roasted --; column 7, line 4, for "TABLE V" read -- TABLE IV --; line 70, for "nickel-metal" read -- nickel --; column 8, line 4, for "0.1%" read -- 0.01% --; lines 57 and 58, for "nickel-metal" read -- nickel --; column 9, line 22, for "nickel-metal" read -- nickel --; line 34, for the claim reference numeral "1" read -- 7 --; column 10, lines 7, 15 and 17, for the claim reference numeral "1", each occurrence, read -- 7 --.

Signed and sealed this 27th day of May 1958.

(SEAL)
Attest:

KARL H. AXLINE
Attesting Officer

ROBERT C. WATSON
Commissioner of Patents